(12) United States Patent
Kennedy et al.

(10) Patent No.: US 9,446,433 B2
(45) Date of Patent: Sep. 20, 2016

(54) ARTICLE CARRIER FOR A GRADING APPARATUS

(71) Applicant: Compac Technologies Limited, Auckland (NZ)

(72) Inventors: Hamish Alexander Nigel Kennedy, Auckland (NZ); Isaac James Anstis, Auckland (NZ); Shon Cornelius Franciscus Van Tiel, Auckland (NZ)

(73) Assignee: Compac Technologies Limited, Auckland (NZ)

( * ) Notice: Subject to any disclaimer, the term of this patent is extended or adjusted under 35 U.S.C. 154(b) by 0 days.

(21) Appl. No.: 14/441,623

(22) PCT Filed: Nov. 6, 2013

(86) PCT No.: PCT/NZ2013/000199
§ 371 (c)(1),
(2) Date: May 8, 2015

(87) PCT Pub. No.: WO2014/073987
PCT Pub. Date: May 15, 2014

(65) Prior Publication Data
US 2015/0298175 A1  Oct. 22, 2015

(30) Foreign Application Priority Data
Nov. 8, 2012  (NZ) ........................ 603481

(51) Int. Cl.
*B65G 47/96* (2006.01)
*B07B 13/16* (2006.01)
(Continued)

(52) U.S. Cl.
CPC .............. *B07B 13/16* (2013.01); *B07B 13/08* (2013.01); *B07C 5/36* (2013.01); *B65G 47/965* (2013.01); *B07C 2501/009* (2013.01); *B65G 2203/0258* (2013.01)

(58) Field of Classification Search
CPC ....... B07B 13/08; B07B 13/16; B65G 47/34; B65G 47/52; B65G 47/96; B65G 2203/0258; B65G 47/962; B65G 47/965
USPC ............................................. 198/370.04, 959
See application file for complete search history.

(56) References Cited

U.S. PATENT DOCUMENTS 5,662,206 A * 9/1997 Baum .................. B65G 47/962
198/370.04
5,677,516 A 10/1997 Leverett
(Continued)

FOREIGN PATENT DOCUMENTS

AU        701354      9/1997
AU     2011201654    10/2011
(Continued)

*Primary Examiner* — Mark A Deuble
(74) *Attorney, Agent, or Firm* — Lowe Graham Jones PLLC

(57) ABSTRACT

An article carrier (100) has a mounting portion (1) adapted for connection to a conveyor. A connecting member (4) is rotatably connected to the mounting portion (1) and is rotatable relative to the mounting portion (1) about a first axis of rotation (R1). A carrier portion (3) is rotatably connected to the connecting member (4) and is rotatable relative to the connecting member (4) about a second axis of rotation (R2), wherein the first axis of rotation (R1) is spaced apart from the second axis of rotation (R2). A releasably lockable carrier support means (5) is provided to support the carrier portion (3) in a carriage position when in a locked state, and to allow rotation of the carrier portion (3) to a discharge position when in an unlocked state.

16 Claims, 5 Drawing Sheets

(51) Int. Cl.
*B07B 13/08* (2006.01)
*B07C 5/36* (2006.01)

(56) References Cited

U.S. PATENT DOCUMENTS

| | | |
|---|---|---|
| 5,998,754 A | 12/1999 | Pervieux |
| 6,374,983 B1 * | 4/2002 | Morigi ................. B65G 47/965 198/370.04 |
| 7,222,715 B2 * | 5/2007 | Madden ................... B07C 5/36 177/145 |
| 7,395,914 B2 * | 7/2008 | van Wijngaarden ...... B65G 47/962 198/370.04 |
| 2011/0309004 A1 * | 12/2011 | Morley .................... B07C 5/36 209/577 |

FOREIGN PATENT DOCUMENTS

| | | |
|---|---|---|
| FR | 2924700 | 6/2009 |
| WO | 93/07972 | 4/1993 |
| WO | 94/14547 | 7/1994 |
| WO | 96/22932 A2 | 8/1996 |

\* cited by examiner

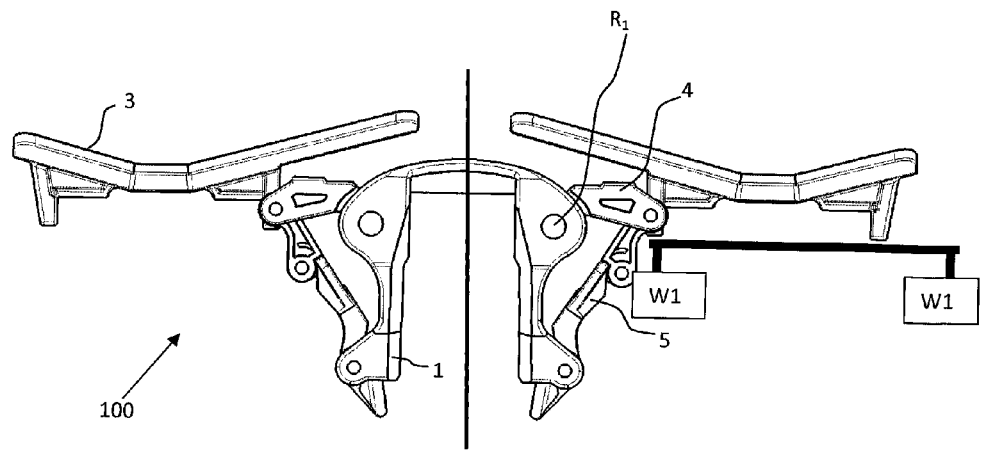
Figure 7
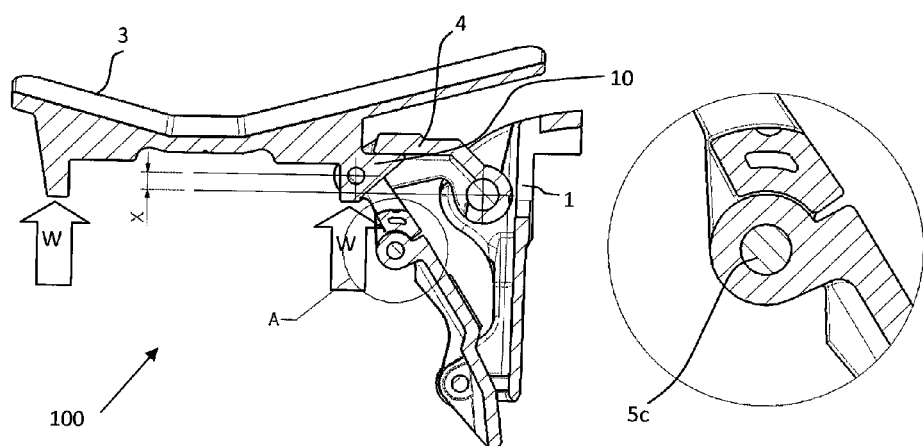
Figure 8  Figure 8A

ARTICLE CARRIER FOR A GRADING APPARATUS

PRIORITY CLAIM

This application is a 371 of international application no. PCT/NZ2013/000199 filed Nov. 6, 2013, which claims priority to New Zealand application no. 603481 filed Nov. 8, 2012; the contents of which are incorporated by reference.

TECHNICAL FIELD OF THE INVENTION

The invention relates to carriers for articles, particularly for use within grading systems, and in particular, but in not exclusively, to an article carrier which is suitable for conveying elongate articles of produce.

BACKGROUND OF THE INVENTION

Article carriers are often used in fruit graders to transport fruit through various measurement stages for grading purposes and to eject fruit at a required location dependent on the result of the grading process. Such article carriers usually include an endless circuit of carriers or cups on a conveyor chain with the cups situated to unload fruit at one of a plurality of stations.

Many of the article carriers of the prior art use rollers to rotate the fruit as they travel along on the conveyor, in order to present the entire surface of the fruit to a grading apparatus such as a camera. The article carriers may also be provided with a mechanism by which a portion of the carrier on which the fruit bears can be isolated from the rest of the carrier, and the supporting portion of the conveyor, in order to allow the fruit to be weighed while it is being conveyed. U.S. Pat. No. 7,410,044 describes an example of one such article carrier.

Such carriers, while well suited to use with generally spherically shaped fruit and vegetables such as apples and the like, are not suitable for use with elongate fruit or vegetables such as cucumbers, mangoes, pears, avocados and the like.

Another type of article carrier is known to the art, in which the article is held to one side of the conveyor chain on elongate "fingers". While such carriers are suitable for elongate fruit or vegetables, they typically do not allow the produce to be weighed accurately.

In the examples discussed above, the article carrier remains connected to, and in motion with, the conveyor chain, while the article is being weighed. The horizontal component of the force exerted by the conveyor chain on the article carrier has no effect on the weighing operation. However, for the weighing operation to be accurate it is important that the connection between the conveyor chain and the carrier portion which is bearing on the load cell exert the minimum possible force on the carrier portion in the vertical direction.

The reference to any prior art in the specification is not, and should not be taken as, an acknowledgement or any form of suggestion that the prior art forms part of the common general knowledge in any country.

OBJECT OF THE INVENTION

It is an object of the present invention to provide an article carrier for a grading apparatus which will overcome or ameliorate problems with the article carriers of the prior art, or which will at least provide a useful choice.

Other objects of the present invention may become apparent from the following description, which is given by way of example only.

BRIEF SUMMARY OF THE INVENTION

According to one aspect of the present invention there is provided an article carrier comprising a mounting portion adapted for connection to a conveyor, a connecting member rotatably connected to the mounting portion and rotatable relative to the mounting portion about a first axis of rotation, a carrier portion rotatably connected to the connecting member and rotatable relative to the connecting member about a second axis of rotation, wherein the first axis of rotation is spaced apart from the second axis of rotation, and a releasably lockable carrier support means adapted to support the carrier portion in a carriage position when in a locked state, and to allow rotation of the carrier support portion to a discharge position when in an unlocked state.

Preferably the first and second axes of rotation are substantially parallel to a direction of travel of the article carrier when in use.

Preferably the carrier portion comprises a rotation limiting portion adapted to limit rotation of the carrier portion relative to the connecting member when the releasably lockable carrier support means is in the locked state.

Preferably the rotation limiting portion bears on the connecting member.

Preferably when the releasably lockable carrier support means is in the unlocked state, the carrier portion is moveable to a weighing position in which the rotation limiting portion does not bear on the connecting member.

Preferably the releasably lockable carrier support means comprises an over-centre linkage.

Preferably the over-centre linkage is rotatably connected to the mounting portion.

Preferably the over-centre linkage is rotatably connected to the connecting member.

Preferably the connection between the over-centre linkage and the connecting member is co-linear with the second axis of rotation.

Preferably the over-centre linkage comprises a first portion which is connected to the mounting portion and a second portion which is connected to the connecting member, wherein the first and second portions are rotatably connected.

Preferably the first portion of the over-centre linkage comprises a trigger portion for moving the over centre linkage to an unlocked position.

Preferably the article carrier is provided with a plurality of carrier portions.

Preferably the article carrier has at least one carrier portion on each side of a central plane of the mounting portion.

Preferably the article carrier has at least one plane of symmetry.

Preferably the article carrier has two planes of symmetry.

According to a second aspect of the present invention there is provided a sorting apparatus comprising a plurality of article carriers of the first aspect.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

According to a still further aspect of the present invention, an article carrier and/or a sorting apparatus comprising the article carrier is substantially as herein described, with reference to the accompanying drawings.

Further aspects of the invention, which should be considered in all its novel aspects, will become apparent from the following description given by way of example of possible embodiments of the invention.

BRIEF DESCRIPTION OF THE DRAWINGS

Preferred and alternative examples of the present invention are described in detail below with reference to the following drawings:

FIG. 7: Is a front view of the article carrier of FIG. 1, with the releasable locking means in an unlocked position and the carriage portion in an upper weighing position.

FIG. 8: Is a transverse cross-section of one side of the article carrier with the carriage portion in the upper weighing position.

FIG. 8A: Is an enlarged view of detail "B" of FIG. 8.

DETAILED DESCRIPTION OF THE PREFERRED EMBODIMENT

Figure 1:
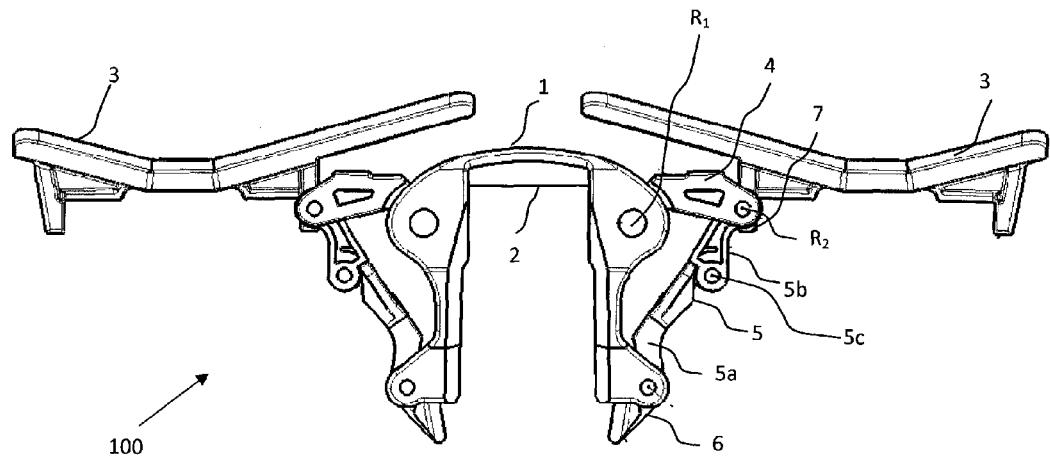
FIG. 1: Is a front view of an article carrier according to one embodiment of the present invention, with the carrier in a carriage position.
Figure 2:
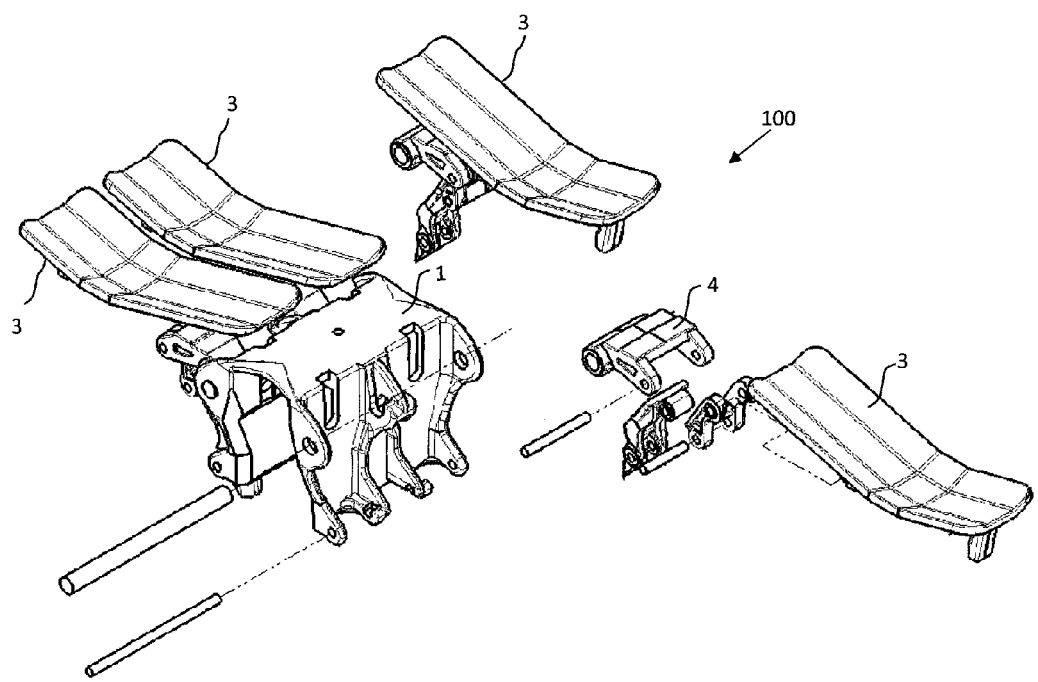
FIG. 2: Is an exploded view of the article carrier of FIG. 1.

Referring first to FIGS. 1 and 2, an article carrier of the present invention is generally referenced by arrow 100.

The article carrier 100 comprises a mounting portion 1 for mounting the carrier 100 to a conveyor chain (not shown), for example by means of a clip 2.

One or more carrier portions 3 are mounted to the mounting portion 1. In the embodiment shown the carrier 100 comprises four carrier portions 3, with two carrier portions 3 on either side of the mounting portion 1. However, other embodiments (not shown) may have more or fewer carrier portions on either side of the mounting portion, or may have one or more carrier portions on only one side of the mounting portion. The article carrier is preferably substantially symmetrical about a central longitudinal plane, and about a vertical plane which is orthongonal to the longitudinal plane, so that the carrier can be mounted to the conveyor chain in either direction.

In the embodiment shown the carrier portions 3 are provided as elongate "fingers", and define a cupped shape in order to securely hold an article.

Each carrier portion 3 is connected to the mounting portion 1 by a connecting member 4. The connecting member 4 is rotatably connected to the mounting portion 1 such that it can rotate about a first axis of rotation R1. The carrier portion 3 is rotatably connected to the connecting member 4 such that it can rotate relative to the connecting member 4 about a second axis of rotation R2. The first and second axes of rotation R1, R2 are spaced apart, and in many embodiments are at opposite ends of the connecting member 4.

The article carrier 100 is further provided with a releasable carrier support means 5. In the embodiment shown the carrier support means 5 comprises an over-centre type linkage which has a first portion 5a rotatably connected to the mounting portion 1 at or adjacent a first end 6 and a second portion 5b rotatably connected to the connecting member 4 at a second end 7. The linkage 5 is of a type which can transmit compressive forces when a link, preferably a hinged connection 5c, between the first and second portions 5a, 5b is on one side of an axis connecting the rotatable connections at either end of the link, but which collapses when the central link is moved to the opposite side of that axis.

In the embodiment shown the connection between the second end 7 of the over-centre linkage 5 and the connecting member 4 is collinear with the connection between the connecting member 4 and the carrier portion 3. However, this is not necessarily the case. The connection between the second end 7 of the over-centre linkage and the connecting member 4 may be at any point on the connecting member 4 which is not collinear with the connecting member's connection to the mounting portion 1.

In the embodiment shown in FIG. 1, the over-centre linkage 5 is in a locked position, suitable for conveying an article on the carrier portion 3.

Figure 3:
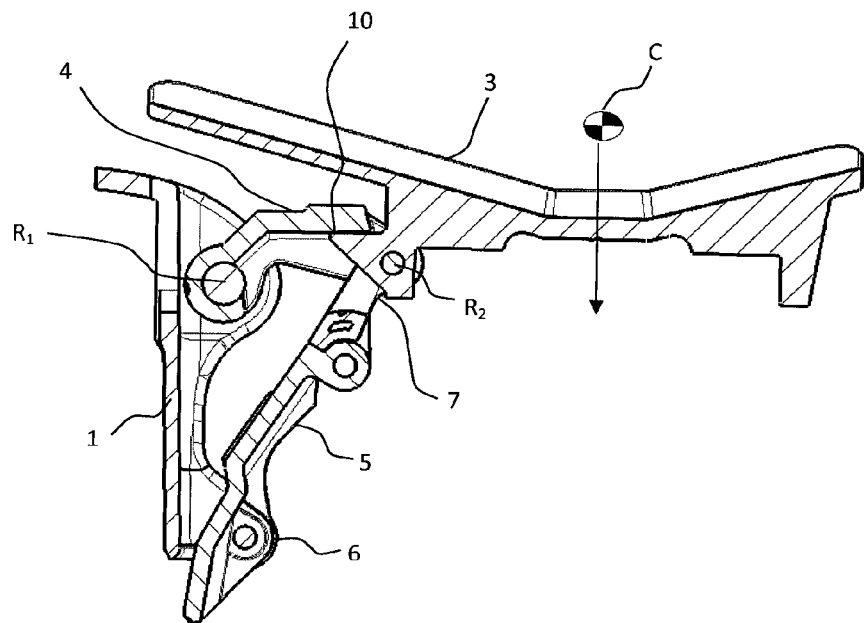
FIG. 3: Is a transverse cross-section of the article carrier of FIG. 1.

In order to maintain the carrier portion 3 in a substantially horizontal orientation (in use), suitable for conveying an article, the rotation of the carrier portion 3 relative to the connecting member 4 must be limited in order to avoid rotation of the carrier portion 3 under its own weight (and the weight of the article). As is best seen in FIG. 3, in a preferred embodiment the carrier portion comprises a rotation limiting formation 10 which extends to an opposite side of the second axis of rotation R2 from the side on which the centre of gravity C of the carrier portion is located. The rotation limiting portion 10 is shaped to bear against the connecting member 4 in order to resist rotation of the carrier portion 3 under the influence of gravity. In the embodiment shown the carrier portion 3 is able to rotate in the opposite direction (i.e anticlockwise in FIG. 3) about the second axis of rotation R2, although rotation in this direction is ultimately limited by interference between an inner edge 13 of the carrier portion (see FIG. 6) and the mounting portion 1.

Figure 4:
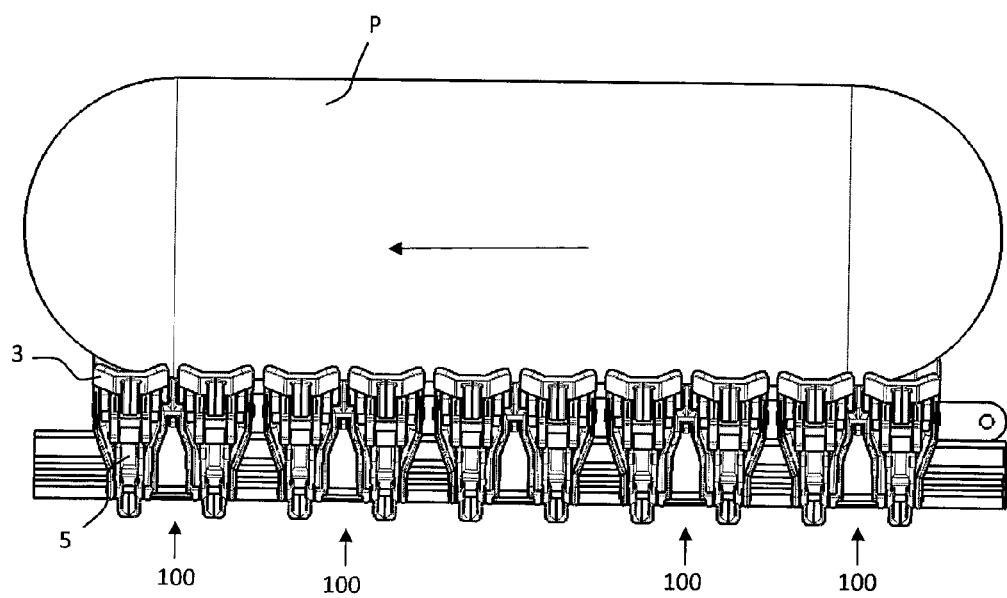
FIG. 4: is a partial side view of a sorting apparatus comprising a plurality of the article conveyors of FIG. 1, conveying an item of produce.

FIG. 4 shows an article of produce P being conveyed by a sorting system of the present invention, with the article of produce being supported by a plurality of article carriers 100.

Figure 5:
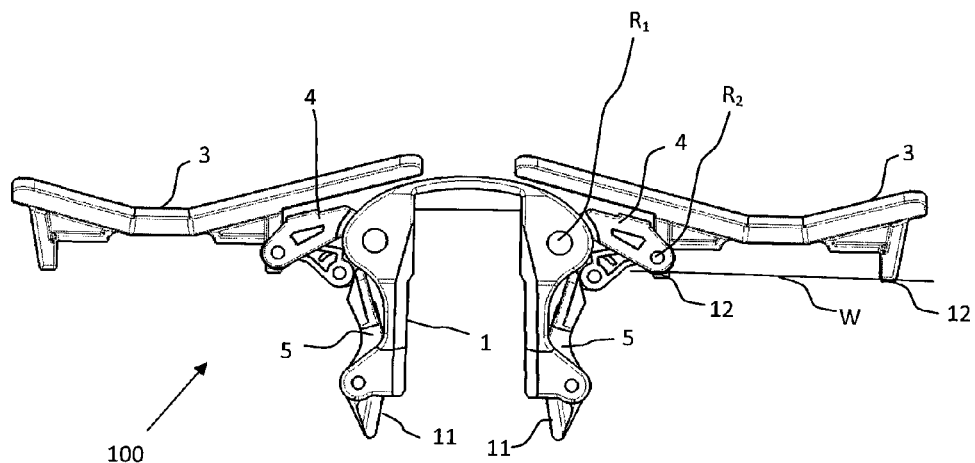
FIG. 5: Is a front view of the article carrier of FIG. 1, with the releasable locking means in an unlocked position and the carriage portion in a lower weighing position.
Figures 6, 6A:
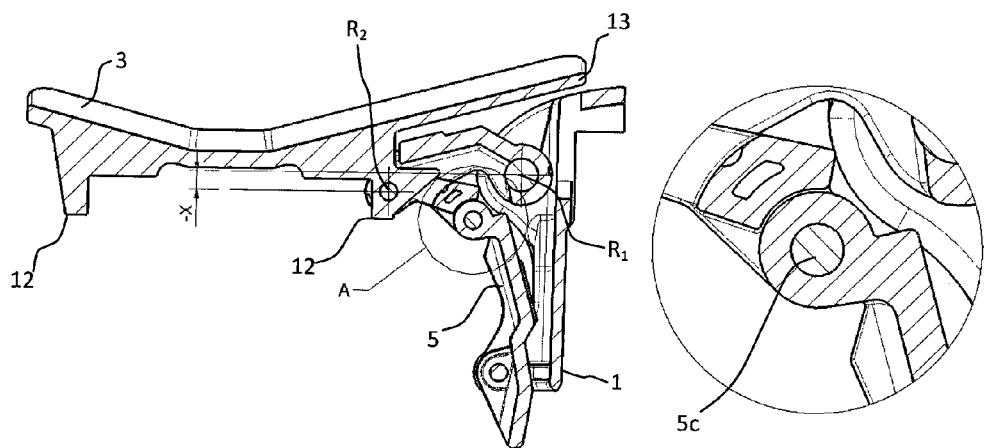
FIG. 6: Is a transverse cross-section of one side of the article carrier with the carriage portion in the lower weighing position.
FIG. 6A: Is an enlarged view of detail "A" of FIG. 6.
Figures 9A, 9B, 9C, 9D:
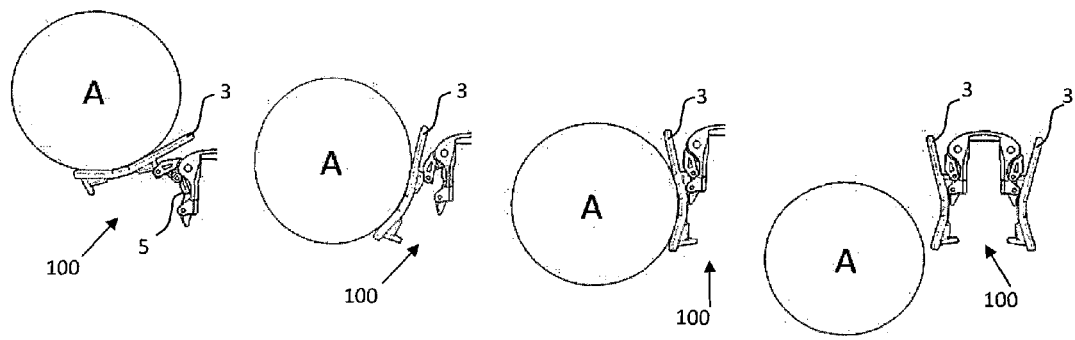
FIGS. 9a-9d: show a sequence of partial front views of the article carrier of FIG. 1 in use, discharging an article.

Referring next to FIGS. 5 and 6, the article carrier 100 is particularly suited for use with sorting systems which individually weigh each item. By exerting a laterally outward force on a trigger portion 11 of the over-centre linkage (for example with a ramp or cam surface, or a solenoid operated trigger pushing mechanism), the over-centre linkage 5 can be moved from the locked position shown in FIG. 1 over-centre to the unlocked position shown in FIGS. 5 and 6, whereby the over-centre linkage 5 no longer supports the weight of the connecting member 4, carrier portion 3 and any produce carried on the carrier portion 3.

The over-centre mechanism 5 is unlocked as the carrier portion 3 moves over a weighing means W. The unsupported carrier portion 3 bears on the weighing means W, and so the weighing means W is able to measure the weight of the item on the carrier portion 3 (and the carrier portion itself). In some embodiments the sorting apparatus may comprise a support surface (not shown) immediately before and/or after the weighing means in order to guide the carrier portion 3 on and/or off the weighing means W.

In the embodiment shown the underside of the carrier portion 3 is provided with a pair of spaced apart downwardly protruding bearing surfaces 12. These bearing surfaces 12 ensure that the contact between the carrier portion 3 and the weighing means W occurs in a consistent and predictable place, and also helps to minimise the drag created by sliding the carrier portion 3 over the surface of the weighing means W.

As can be seen in FIGS. 5 and 6, in the embodiment shown, the centre of the carrier portion 3 maintains a substantially horizontal orientation during the weighing operation.

FIGS. 5 and 6 show the carrier portion 3 at the lowest position in which accurate weighing can occur. If the carrier portion 3 were to be lowered any further relative to the mounting portion 1 then an inner edge 13 of the carrier portion 3 would abut the mounting portion 1, thereby making accurate weighing impossible.

FIGS. 7 and 8 show the carrier portion 3 at the highest position in which weighing can occur. Further elevation (relative to the mounting portion 1) of the carrier portion 3 beyond this position will result in the over-centre linkage 5 being placed in tension and/or the rotation limiting portion 10 abutting the connecting member 4. In one embodiment the centre of the carrier portion 3 is approximately 6 mm higher (relative to the mounting portion 1) when in the highest position (shown in FIGS. 7 and 8), relative to when it is in the lowest position (shown in FIGS. 5 and 6). The rotation limiting portion 10 does not abut or bear on the connecting member 4 (or any other member) when the carrier portion is in a weighing position.

Those skilled in the art will appreciate that because the first and second axes of rotation R1, R2 are substantially parallel to the direction of travel of the carrier portion 3 as it moves over the weighing means W (and the direction of travel of the conveyor chain), the force exerted by the connecting member 4 to move the carrier portion 3 over the weighing means W has little or no vertical component, and so has a minimal effect on the accuracy of the weight measurement. To further minimise any vertical component of force exerted by the connecting member, the weighing means is preferably located such that the first and second axes of rotation R1, R2 are both horizontally orientated during the weighing operation.

FIGS. 9a-9d illustrate an article of produce A being discharged from the article carrier 100 as a result of the releasable carrier support means 5 being unlocked and the article carrier 3 moving to a discharge position.

The releasable carrier support means 5 is unlocked when the article carrier 100 is adjacent a selected receiving portion of the sorting apparatus. The releasable carrier support means 5 is preferably unlocked by a solenoid operated trigger pushing mechanism or similar apparatus (not shown), as has been described above. The particular receiving portion which the sorting apparatus elects to eject the produce into may depend on the weight of the produce, as well as information gathered from other assessment apparatus such as cameras and the like.

As can be seen in FIGS. 9a-9d, the article A tends to fall substantially vertically, with the article carrier 100 exerting almost no horizontal force on the article A as it drops. The carrier portion 3 is able to rotate from a substantially horizontal orientation to a substantially vertical one.

Figure 10:
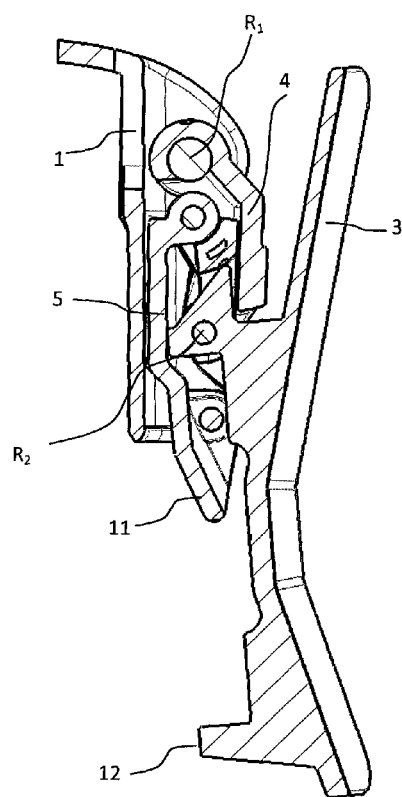
FIG. 10: Is a transverse cross-section of one side of the article carrier, with the carriage portion in the discharge position.

FIG. 10 shows the carrier portion 3 in the discharge position.

The sorting apparatus is preferably provided with a ramp or cam surface (not shown) immediately ahead a final receiving portion of the apparatus. The ramp acts on the trigger portion of any article carriers which have not yet been released into the discharge position. In this way it is assured that the produce is discharged from all of the article carriers 100 before they begin a new cycle of the apparatus.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the appended claims.

The embodiments of the invention in which an exclusive property or privilege is claimed are defined as follows:

1. An article carrier comprising a mounting portion adapted for connection to a conveyor, a connecting member rotatably connected to the mounting portion and rotatable relative to the mounting portion about a first axis of rotation substantially parallel to a direction of travel of the article carrier when in use, a carrier portion rotatably connected to the connecting member and rotatable relative to the connecting member about a second axis of rotation substantially parallel to a direction of travel of the article carrier when in use, wherein the first axis of rotation is spaced apart from the second axis of rotation, the carrier portion further comprising a rotation limiting portion adapted to limit rotation of the carrier portion relative to the connecting member when the releasably lockable carrier support means is in a locked state by bearing on the connecting member, and a releasably lockable carrier support means adapted to support the carrier portion in a carriage position when in the locked state, and to allow rotation of the carrier portion to a discharge position when in an unlocked state.

2. The article carrier of claim 1, wherein, when the releasably lockable carrier support means is in the unlocked state, the carrier portion is moveable to a weighing position in which the rotation limiting portion does not bear on the connecting member.

3. The article carrier of claim 1, wherein the releasably lockable carrier support means comprises an over-centre linkage.

4. The article carrier of claim 3, wherein the over-centre linkage is rotatably connected to the mounting portion.

5. The article carrier of claim 4, wherein the over-centre linkage is rotatably connected to the connecting member.

6. The article carrier of claim 5, wherein the connection between the over-centre linkage and the connecting member is co-linear with the second axis of rotation.

7. The article carrier of claim 3, wherein the over-centre linkage comprises a first portion which is connected to the mounting portion and a second portion which is connected to the connecting member, wherein the first and second portions are rotatably connected.

8. The article carrier of claim 7, wherein the first portion of the over-centre linkage comprises a trigger portion for moving the over-centre linkage to an unlocked position.

9. The article carrier of claim 8, wherein the article carrier is provided with a plurality carrier portions.

10. The article carrier of claim 1, wherein the article carrier has at least one carrier portion on each side of a central plane of the mounting portion.

11. The article carrier of claim 10, wherein the article carrier has at least one plane of symmetry.

12. The article carrier of claim 11, wherein the article carrier has two planes of symmetry.

13. A sorting apparatus comprising a plurality of article carriers as claimed in claim 1.

14. The article of claim 2 wherein the releasably lockable carrier support means comprises an over the centre linkage.

15. The article carrier of claim 9 wherein the article carrier has at least one carrier portion on each side of a central plane of the mounting portion.

16. A sorting apparatus comprising a plurality of article carriers as claimed in claim 15.

* * * * *